United States Patent [19]

Kakugo et al.

[11] Patent Number: 5,141,994

[45] Date of Patent: Aug. 25, 1992

[54] CRYSTALLINE POLYPROPYLENE AND CRYSTALLINE POLYPROPYLENE COMPOSITION

[75] Inventors: Masahiro Kakugo; Hajime Sadatoshi; Jiro Sakai; Kazuki Wakamatsu, all of Chiba; Kazuhiro Chikaishi, Ibaraki; Toshiro Kojima, Ibaraki; Hideo Nomura, Ibaraki; Tomohisa Fukao, Chiba, all of Japan

[73] Assignee: Sumitomo Chemical Co., Ltd., Osaka, Japan

[21] Appl. No.: 432,443

[22] Filed: Nov. 6, 1989

[30] Foreign Application Priority Data

Nov. 4, 1988 [JP] Japan .................. 63-279934
Nov. 16, 1988 [JP] Japan .................. 63-290921

[51] Int. Cl.$^5$ .................. C08L 23/12; C08F 110/06; C08F 297/08
[52] U.S. Cl. .................. 525/216; 525/240; 525/88; 525/95; 526/351
[58] Field of Search .................. 525/216, 240, 88, 95; 526/351

[56] References Cited

U.S. PATENT DOCUMENTS

| | | | |
|---|---|---|---|
| 4,551,501 | 11/1985 | Shiga et al. | 525/88 |
| 4,584,239 | 4/1986 | Kakugo et al. | 428/349 |
| 4,603,174 | 7/1986 | Okada et al. | 525/240 |

FOREIGN PATENT DOCUMENTS

| | | |
|---|---|---|
| 0151883 | 8/1985 | European Pat. Off. |
| 0227300 | 7/1987 | European Pat. Off. |
| 56-002307 | 1/1981 | Japan |
| 58-007406A | 1/1983 | Japan |
| 59-172507 | 3/1983 | Japan |
| 60-139731 | 7/1985 | Japan |
| 62-195007 | 8/1987 | Japan |

Primary Examiner—Carman J. Seccuro
Attorney, Agent, or Firm—Sughrue, Mion, Zinn, Macpeak & Seas

[57] ABSTRACT

Crystalline polypropylene excellent in rigidity, heat resistance and surface hardness is disclosed, having a ratio of weight average molecular weight (Mw) to number average molecular weight (Mn) (Mw/Mn) of 10 or more, an intrinsic viscosity $[\eta]$ of from 0.8 to 5.0 dl/g as measured in tetralin at 135° C., a cold xylene-soluble content (CXS) of not more than 4% by weight, a density (d) of 0.910 g/cm$^3$ or more as measured at 23° C., and a long period (L) (Å) as measured at 25° C. by a small-angle X-ray scattering method satisfying relationship:

$$L \leq LC = 6667d - 5894$$

wherein d is a density at 23° C.; and Lc is a value (Å) obrained by equation:

$$Lc = 6667d - 5894.$$

A crystalline polypropylene composition containing the foregoing crystalline polypropylene, which is excellent in rigidity and heat resistance, is also disclosed.

5 Claims, No Drawings

CRYSTALLINE POLYPROPYLENE AND CRYSTALLINE POLYPROPYLENE COMPOSITION

FIELD OF THE INVENTION

This invention relates to crystalline polypropylene excellent in rigidity, heat resistance, and surface hardness and to a crystalline polypropylene composition containing the same, which is excellent in rigidity and heat resistance.

BACKGROUND OF THE INVENTION

Crystalline polypropylene is broadly used as general-purpose resin because of its relatively excellent rigidity, heat resistance and surface hardness. However, these properties possessed by crystalline polypropylene are still unsatisfactory as compared with those of ABS resins, polystyrene resins or various engineering plastics.

Isotactic polypropylene is a stereoregular polymer, and the solid thereof has a partially crystallized structure. Properties of a solid are known to be intimately related to the solid structure. That is, the above-described various properties generally depend on the degree of crystallization, and according as crystallinity increases, rigidity, heat resistance, and surface hardness are improved. From this point of view, many approaches to improve these properties have hitherto been made, such as a method for reducing the by-produced atactic component by, for example, improving the catalyst as disclosed in *Kagaku Zokan* 43, "Kobunshi no Characterization to Bussei", Kagaku Dojin (1970); a method for broadening a molecular weight distribution as disclosed in JP-A-59-172507 and JP-A-62-195007 (the term "JP-A" as used herein means an "unexamined published Japanese patent application"); and a method using a nucleating agent, for example, an aluminum or sodium salt of an aromatic carboxylic acid (see JP-A-58-80329), an aromatic carboxylic acid, an aromatic phosphoric acid salt, a sorbitol derivative [see JP-B-55-12460 (the term "JP B" as used herein means an "examined published Japanese patent application") and JP-A-58-129036], and a specific high-molecular weight nucleating agent (see JP-A-60-139710 and JP-A 60-139731).

However, none of these known methods have achieved sufficient improvements in the properties.

On the other hand, polypropylene is most commonly formed into a desired shape after being once melted. Crystallinity changes depending on the processing conditions, and thereby varying the properties. More specifically, rigidity and the like can be improved by a method of reducing a rate of cooling for crystallization, a method in which a molded article is subjected to annealing at a high temperature below the melting point, or the like technique. However, these methods cause reduction in rate of processing or require equipment or energy for the heat treatment. Also, the improvements obtained are still insufficient.

SUMMARY OF THE INVENTION

An object of this invention is to provide crystalline polypropylene and a crystalline polypropylene composition having improved rigidity, heat resistance, and surface hardness.

As a result of extensive studies, the inventors have found that rigidity, heat resistance, and hardness of polypropylene are closely related not only to crystallinity but to a long period which is an indication of the size of a unit constituting the solid structure and thus reached the present invention.

The present invention relates to crystalline polypropylene having a ratio of weight average molecular weight (Mw) to number average molecular weight (Mn) (Mw/Mn) of 10 or more, an intrinsic viscosity $[\eta]$ of from 0.8 to 5.0 dl/g as measured in tetralin at 135° C., a cold xylene-soluble content (CXS) of not more than 4% by weight, a density (d) of 0.910 g/cm$^3$ or more as measured at 23° C., and a long period (L) (Å) as measured at 25° C. by a small-angle X-ray scattering method satisfying relationship:

$$L \leq Lc = 6667d - 5894$$

wherein d is a density at 23° C.; and Lc is a value (Å) obtained by equation:

$$Lc = 6667d - 5894.$$

The present invention further relates to a crystalline polypropylene composition comprising (A) crystalline polypropylene having an Mw/Mn ratio of 10 or more, an intrinsic viscosity $[\eta]$ of from 0.8 to 5.0 dl/g as measured in tetralin at 135° C., and a CXS of not more than 4% by weight and (B) from 1 ppm to 20% by weight, based on the composition, of a polymer of an α-olefin or vinylcycloalkane whose homopolymer has a melting point of not lower than 270° C., said composition having a density (d) of 0.910 g/cm$^3$ or more at 23° C. and a long period (L) (Å) satisfying relationship:

$$L \leq Lc = 6667d - 5894$$

wherein L, Lc, and d are as defined above.

DETAILED DESCRIPTION OF THE INVENTION

It is known that isotactic polypropylene usually has a lamellar structure consisting of alternating monoclinic crystallites and amorphous regions; long period is a measure of the unit size of the structure and density reflects the degree of crystallization. However, relations between the unit size of the lamellar structure and properties of polypropylene still have not been revealed well, while the degree of crystallization is noted as an important factor in the improvement of properties as described above.

The inventors have made it clear that crystalline polypropylene whose long period (L; Å) as obtained by a small-angle X-ray scattering method satisfies relationship:

$$L \leq Lc = 6667d - 5894$$

wherein d is a density (g/m$^3$) at 23° C.; and Lc is a value (Å) calculated from equation:

$$Lc = 6667d - 5894$$

has improved modulus, heat resistance, and surface hardness.

It has also turned out clear that these properties are markedly improved further when the above-described crystalline polypropylene has a density (d) of 0.910 g/cm³ or more, preferably 0.911 g/cm³ or more, more preferably 0.912 g/cm³ or more at 23° C.

The solid structure of the crystalline polypropylene according to the present invention is characterized by its high density and short long period. The inventors have found that the density can be increased and, at the same time, an increase of the long period can be minimized by increasing a rate of weight average molecular weight to number average molecular weight (Mw/Mn), an indication of molecular weight distribution, and by reducing a low-crystalline polymer content.

The Mw/Mn is 10 or more, preferably 15 or more. The low-crystalline polymer content, i.e., the amount of cold xylene-soluble part (CXS), is not more than 4% by weight, preferably not more than 3% by weight, more preferably not more than 2% by weight. With these requirements being met, crystalline polypropylene having a high density and a long period whose increase is minimized can be obtained.

A method for producing the crystalline polypropylene having the above described solid structure is described below, but the present invention is not construed as being limited thereto.

The method comprises compounding a polymer of an α-olefin or vinylcycloalkane whose homopolymer has a melting point of 270° C. or higher into crystalline polypropylene having an Mw/Mn of 10 or more, a low-crystalline polymer content (CXS) of not more than 4% by weight, and an intrinsic viscosity [η] of from 0.8 to 5.0 dl/g, preferably from 1.0 to 3.0 dl/g, as measured in tetralin at 135° C.

The α-olefin or vinylcycloalkane polymer is preferably a polymer of a 3-branched α-olefin or vinylcycloalkane having 5 or more carbon atoms, more preferably a polymer of vinylcyclopentane or vinylcyclohexane. The α-olefin or vinylcycloalkane polymer is used in an amount of from 1 wt ppm to 20 wt%, preferably from 10 wt ppm to 15 wt%, more preferably from 50 wt ppm to 10 wt%, based on the polymer composition.

The crystalline polypropylene having the above-specified molecular structure and solid structure according to the present invention can be formed into articles of various shapes through known techniques, such as injection molding, extrusion, blow molding, compression molding, vacuum molding, drawing, etc.

If desired, the crystalline polypropylene of the present invention can contain any of additives usually employed for polypropylene, such as stabilizers, light stabilizers, antistatic agents, lubricants, flame retardants, and so on. The crystalline polypropylene can also be mixed with other polymers which are a homopolymer or copolymer of an α-olefin having from 2 to 18 carbon atoms, such as low-density polyethylene, linear low-density polyethylene, high-density polyethylene, polybutene, an ethylene-propylene rubber, an ethylene-1-butene copolymer, and a propylene-1-butene copolymer, or inorganic fillers, e.g., mica, talc, glass fiber, etc.

The method for producing the crystalline propylene polymer (A) having a broad molecular weight distribution is not particularly limited and includes, for example, a method of using two kinds of crystalline propylene polymers differing in molecular weight as disclosed in JP-A-50-37696, a method in which crystalline propylene polymers having different molecular weights are produced through multiple stages as disclosed in JP-A-59-172507 and JP-A 58-7406, and a method using a specific catalyst component as disclosed in JP-A-56- 2307, JP-A-56-104909, JP-A-56-104910, and JP-A-56-157407.

The crystalline propylene polymer of the present invention provides a composition exhibiting excellent performance properties when it has an Mw/Mn of 10 or more, preferably 15 or more. The Mw/Mn can be determined by gel permeation chromatography (GPC). If the MW/Mn is less than 10, the resulting composition has low rigidity and low heat resistance.

The improvement in rigidity can be further enhanced when the crystalline propylene polymer has a low content of a so-called low-crystalline polymer component which is soluble in cold xylene (20° C.) (hereinafter referred to as CXS). The CXS in the crystalline propylene polymer is preferably not more than 4% by weight, more preferably not more than 3% by weight, most preferably not more than 2% by weight. The term "crystalline propylene polymer" as used herein embraces a propylene homopolymer and a random copolymer of propylene and an α-olefin having from 2 to 18 carbon atoms other than propylene. The crystalline propylene polymer may further be subjected to block copolymerization of propylene with an α-olefin having from 2 to 18 carbon atoms other than propylene to an extent of from 5 to 40% and preferably from 10 to 30% by weight based on the composition. In this case, it is necessary that the crystalline propylene polymer component obtained in the former stage should have the molecular structure as specified in the present invention.

The polymer (B) which can be used in the present invention is a polymer of an α-olefin or vinylcycloalkane (hereinafter inclusively referred to as a vinyl compound) whose homopolymer has a melting point of 270° C. or higher, preferably a polymer of a 3-branched α-olefin or vinylcycloalkane having 5 or more carbon atoms, more preferably a polymer of vinylcyclopentane or vinylcyclohexane. The vinyl compound polymer (B) may be a copolymer of a mixture of the above-described vinyl compounds or a random copolymer with a small proportion of other α-olefins.

The vinyl compound polymer (B) is used in an amount of from 1 wt ppm to 20 wt%, preferably from 10 wt ppm to 15 wt%, more preferably from 50 wt ppm to 10 wt%, based on the polymer composition.

The composition according to the present invention can be prepared by mixing the polymers (A) and (B) in a known manner, such as melt kneading or solution mixing. At least a part of the composition of the polymers (A) and (B) can be produced by block copolymerization. The block copolymerization method is advantageous in that a composition of satisfactory dispersion can be prepared economically.

The block copolymerization is carried out in such a manner that polymerization of the vinyl compound is performed in any one stage of multi-stage copolymerization. For example, a first stage polymerizing the vinyl compound is followed by a second stage polymerizing propylene; or a first stage polymerizing propylene is followed by a second stage polymerizing the vinyl compound, and further followed by a third stage polymerizing propylene. Further, in the stage of propylene polymerization, propylene may be random- or block-copolymerized with an α-olefin having from 2 to 18 carbon atoms other than propylene.

The thus synthesized block copolymer may further be mixed with the polymer (A).

Specific examples of suitable vinyl compounds are 3,3-dimethylbutene-1, 3-methylbutene-1, 4,4-dimethylpentene-1, 3 methylpentene-1, 3-methylhexene-1, 3,5,5-trimethylhexene-1, vinylcyclopentene, vinylcyclohexane, and vinylnorbornane.

The catalyst system which can be used for preparing the vinyl compound polymer (B) and/or the crystalline propylene polymer (A) having a broad molecular weight distribution is not particularly limited. Known Ziegler-Natta catalysts composed of a titanium compound, an organoaluminum compound, and an electron donating compound are suitably used.

Polymerization for obtaining the vinyl compound polymer (B) and/or the crystalline propylene polymer (A) having a broad molecular weight distribution can suitably be carried out with or without a hydrocarbon solvent, e.g., propane, butane, hexane, heptane, benzene, toluene, etc., at a temperature between 20° C. and 100° C similar to polymerization of α-olefins using a general Ziegler-Natta catalyst. If desired, a molecular weight regulator, e.g., hydrogen, may be used for molecular weight control.

For the production of the crystalline propylene polymer having a broad molecular weight distribution, any of the above-described methods can be utilized. Suitable methods include (1) a method comprising mixing polymers having different molecular weights and (2) a method using a catalyst system capable of producing a polymer of broad molecular weight distribution. The method (1) can be embodied by a method in which two kinds of polymers differing in molecular weight are mixed in a dissolved or molten state or a method in which polymers having different molecular weights are produced through multi-stage polymerization. In the method (1), it is preferable that the ratio of molecular weights of polymers to be mixed is as large as possible so as to obtain a broad molecular weight distribution. However, in the case of melt-kneading or continuous multi-stage polymerization, there is a disadvantage that the molded articles are apt to suffer from unevenness or fish eyes according as the molecular weight ratio becomes larger. To eliminate such a disadvantage, the method (2) is preferably adopted.

Suitable catalyst systems to be used in the method (2) include those comprising (a) a titanium halide compound, (b) an organoaluminum compound, and (c) an electron donating compound, wherein the organoaluminum compound (b) is selected from:

(b-i) a compound represented by formula:

$$R_{3-(m+n)}Al(OR')_m X_n$$

wherein R and R' each represents a hydrogen atom and/or an alkyl, alkynyl, alkenyl, alicyclic hydrocarbon or aromatic hydrocarbon group having up to 18 carbon atoms; X represents a halogen atom; $0 \leq m < 2$; $0 \leq n < 2$; and $0 < (m+n) \leq 2$,
as described in JP-A-56-2307, (b-ii) a compound represented by formula:

$$R^1{}_{3-(m+n)}Al(OSiR^2R^3R^4)_m X_n$$

wherein $R^1$, $R^2$, $R^3$, and $R^4$ each represents a hydrogen atom and/or an alkyl, alkynyl, alkenyl, alicyclic hydrocarbon or aromatic hydrocarbon group having up to 18 carbon atoms; X represents a halogen atom; $0 < m < 2$; $0 \leq n < 2$; and $0 < (m+n) \leq 2$,
as disclosed in JP-A-56-104909, (b-iii) a compound represented by formula:

$$R^5{}_{3-(m+n)}Al Y_m X_n$$

wherein Y represents $NR^6R^7$, $SR^8$ or $PR^9R^{10}$; $R^5$, $R^6$, $R^7$, $R^8$, $R^9$, and $R^{10}$ each represents a hydrogen atom and/or an alkyl, alkynyl, alkenyl, alicyclic hydrocarbon or aromatic hydrocarbon group having up to 18 carbon atoms; X represents a halogen atom; $0 < m < 2$; $0 \leq n < 2$; and $0 < (m+n) \leq 2$,
as disclosed in JP-A-56-104910, and (b-iv) a compound represented by formula:

$$R^{11}{}_{3-(m+n)}Al(OOR^{12})_m X_n$$

wherein $R^{11}$ and $R^{12}$ each represents a hydrogen atom and/or an alkyl, alkynyl, alkenyl, alicyclic hydrocarbon or aromatic hydrocarbon group having up to 18 carbon atoms; X represents a halogen atom; $0 < m < 2$; $0 \leq n < 2$; and $0 < (m+n) \leq 2$;
as disclosed in JP-A-56-157407;

and the electron donating compound (c) is selected from an oxygen-containing organic compound, a nitrogen-containing organic compound, a phosphorus-containing organic compound, and a sulfur-containing organic compound. Specific examples of suitable electron donating compounds are methyl acrylate, methyl methacrylate, methyl benzoate, ethyl benzoate, methyl toluylate, methyl anisate, and ethyl anisate.

These catalyst systems can be used not only for polymerization for producing the crystalline propylene but for polymerization of the vinyl compound.

The present invention is now illustrated in greater detail with reference to the following Examples, but it should be understood that the present invention is not deemed to be limited thereto.

Unless otherwise indicated, all the parts and percents are by weight in these examples. Various physical properties were determined as follows.

1) Intrinsic Viscosity [η]

Measured in tetraline at 135° C. with a Ubbelohde's viscometer.

2) Cold Xylene-Soluble Content (CXS)

A sample polymer weighing 0.5 g was put in 100 ml of xylene and dissolved by boiling for 30 minutes. The solution was kept at 20° C. for 1 hour. The polymer precipitated was separated by filtration, and the proportion of the polymer remaining in the solvent was taken as a cold xylene-soluble content.

3) Preparation of Specimens

The specimens were prepared according to JIS K6758-1981 unless otherwise specified. The specimen for measuring a long period and that for measuring density were the same.

4) Density (d)

Measured in accordance with JIS K7112 A method.

5) Long period (L)

An intensity of small-angle X-ray scattering was measured with "RU-200" manufactured by Rikagaku Denski K.K., and a long period (L; Å) was calculated from the small angle reflection according to Bragg's formula:

$$L = \frac{\lambda}{2\sin(\chi/2)}$$

wherein $\lambda$ is a wavelength of X-rays; and $\chi$ is an angle at which scattering intensity becomes maximum.

The wavelength of X-rays used for the measurement was 1.5418 Å, and the measuring temperature was 25° C.

6) Flexural Modulus

Measured according to ASTM D790-66.

7) Vicat Softening Point (VSP)

Measured according to JIS K7206 B method.

8) Rockwell Hardness

Measured according to JIS K7202 R scale.

9) Molecular Weight Distribution

Expressed in terms of a rate of weight average molecular weight (Mw) to number average molecular weight (Mn) as determined by GPC.

The measuring conditions were as follows. The calibration curve was prepared using polystyrene as a standard.

Chromatograph: Model 150C (manufactured by Millipore Waters Inc.)
Column: Shodex M/S800
Temperature: 140° C.
Solvent: o-Dichlorobenzene
Sample Concentration: 5 mg/8 ml 12) Izod Impact Strength Measured at 23° C. according to JIS K7110.

EXAMPLE 1

Preparation of Solid Catalyst

1) Synthesis of Solid Intermediate:

In a 500 ml-volume flask equipped with a stirrer and a dropping funnel whose atmosphere had been displaced with argon, 110 ml of n-heptane and 67 ml of titanium tetra-n-butoxide, and the inner temperature was maintained at 35° C. A solution comprising 108 ml of n-heptane and 44.5 ml of ethylaluminum sesquichloride was slowly added dropwise through the dropping funnel over a period of 2 hours while keeping the inner temperature at 35° C. After completion of the addition, the temperature was raised to 60° C., and the mixture was stirred for 1 hour, followed by allowing to stand at room temperature for liquid-solid separation. The solid was washed four times with 10 ml portions of n-heptane and dried under reduced pressure to obtain a reddish brown solid product. The solid product was found to contain 5.2 mmol of titanium and 7.0 mmol of n-butoxy group per gram.

2) Synthesis of Solid Catalyst

In a 100 ml volume flask whose atmosphere had been displaced with argon were charged 5.4 g of the solid product as obtained in 1) above and 27 ml of n-heptane, and the temperature in the flask was maintained at 65° C. Then, 4.8 ml of di n butyl ether and 15.6 ml of titanium tetrachloride were added thereto, and the mixture was allowed to react at 65° C. for 1 hour, followed by allowing to stand at room temperature for liquid-solid separation. The solid was washed four times with 50 ml portions of n-heptane and dried under reduced pressure to obtain a solid catalyst component.

Polymerization

In a 0.2 l-volume glass-made flask were successively charged 100 ml of dehydration-purified n-heptane, 1.5 mmol of diethylaluminum chloride, and 2.5 g of the solid catalyst. To the mixture was further added 4.2 ml of vinylcyclohexane, and a polymerization reaction was conducted at 60° C. for 4 hours. The solid catalyst containing the produced vinylcyclohexane polymer was washed with 100 ml of dehydration-purified n-heptane, and a part of the slurry was analyzed. As a result, it was found that 1.3 g of polyvinylcyclohexane was produced per gram of the solid catalyst.

Subsequently, 1 of dehydration-purified n-heptane, 8.5 mmol of an organoaluminum compound of formula $(C_2H_5)_2Al(OBu)_{0.3}Cl_{0.7}$ (wherein OBu represents a butoxy group), 0.85 mmol of methyl toluylate, and 0.640 g of the above-obtained solid catalyst containing the vinylcyclohexane polymer were successively charged in a 3 l-volume SUS-made autoclave equipped with a stirrer whose atmosphere had been displaced with argon. Then, 50 g of propylene and hydrogen at a partial pressure of 1.5 atm. were added thereto to continue the polymerization for an additional period of 6 hours at 60° C. During the reaction, propylene was fed so as to maintain the polymerization pressure at 6 kg/cm$^2$G. The polymerization was terminated by addition of 50 ml of butanol, and the inner pressure was released. After allowing to stand at 60° C. for 1 hour, the polymerization mixture was taken out and filtered to obtain 187.5 g of a vinyl-cyclohexane-propylene block copolymer. The polymer had an Mw/Mn of 12.5, an $[\eta]$ of 1.98 dl/g, and a CXS of 1.0% and contained 1890 ppm of the vinylcyclohexane polymer component.

Measurements of Physical Properties

To 100 parts of the resulting polymer were added 0.1 part of Irganox ® 1010 (a tradename of tetrakis [methylene-3-(3',5'-t-dibutyl 4-hydroxyphenyl)propionate] produced by Ciba-Geigy AG), 0.2 part of 2,6-di-t-butyl-p-cresol (hereinafter abbreviated as BHT), and 0.1 part of calcium stearate. The mixture was melt-kneaded at 190° C. for 3 minutes in an 76 mm$\phi$ open roll (manufactured by Terakawa Seisakusho K.K.) and molded to obtain specimens. The results of measurements of physical properties are shown in Table 1 below.

EXAMPLE 2

Preparation of Solid Catalyst

A solid catalyst was prepared in the same manner as in Example 1.

Polymerization

In a 0.2 l-volume glass-made flask were successively charged 100 ml of dehydration-purified n-heptane, 1.5 mmol of diethylaluminum chloride, and 1.0 g of the solid catalyst. Then, 17 ml of vinylcyclohexane was added thereto to effect polymerization at 60° C. for 4 hours.

The solid catalyst containing the produced vinylcyclohexane polymer was washed with 100 ml of dehydration-purified n-heptane, and a part of the slurry was analyzed. As a result, it was found that 12.5 g of polyvinylcyclohexane was produced per gram of the solid catalyst.

Subsequently, in a 3-l-volume SUS-made autoclave equipped with a stirrer whose atmosphere had been displaced with nitrogen were successively charged 1 l of dehydration-purified n-heptane, 8.5 mmol of an organoaluminum compound of formula $(C_2H_5)_2Al(OBu)_{0.3}Cl_{0.7}$, 0.85 mmol of methyl toluylate, and 3.44 g of the above-obtained solid catalyst containing the vinylcyclohexane polymer. To the mixture were fed 50 g of propylene and hydrogen at a partial pressure 1.5 atm. to effect polymerization at 60° C. for 4 hours. During the polymerization, propylene was fed so as to maintain the polymerization pressure at 6 kg/cm²G. The polymerization was terminated by addition of 50 ml of butanol, and the inner pressure was released, followed by allowing to stand at 60° C. for 1 hour. The polymerization mixture was taken out and filtered to obtain 233 g of a vinyl-cyclohexane-propylene block copolymer. The polymer had an Mw/Mn of 11.8, a CXS of 1.8%, and an $[\eta]$ of 1.81 dl/g and contained 13400 ppm of the vinylcyclohexane polymer component.

Measurements of Physical Properties

Physical properties of the resulting polymer were measured in the same manner as in Example 1. The results obtained are shown in Table 1.

EXAMPLE 3

To a 5.7 m³-volume SUS-made reaction vessel equipped with a stirrer was fed propylene at 35° C. to a pressure of 0.5 kg/cm²G, and 2.7 m³ of n-heptane, 20 mol of an organoaluminum compound of formula $(C_2H_5)_2Al(OBu)_{0.3}Cl_{0.7}$, and 2 mol of methyl toluylate were successively added thereto. Then, 3020 g of a solid catalyst containing a vinylcyclohexane-propylene block copolymer prepared in the same manner as in Example 1 was added thereto. After adjusting the temperature at 60° C., propylene was fed thereto at a rate of 500 kg/hr to elevate the inner pressure up to 6 kg/cm²G. Subsequently, the polymerization reaction was continued while feeding propylene so as to maintain the polymerization pressure at 6 kg/cm²G and feeding hydrogen so as to maintain the gaseous phase concentration at 20% by volume. At the point when the total amount of propylene fed reached 802 kg, propylene feed was stopped, and the polymerization was further continued until the pressure fell to 3 kg/cm²G.

The polymerization slurry was immediately transferred to an after-treatment vessel and, after the reaction was terminated by addition of butanol, allowed to stand at 60° C. for 13 hours. The slurry was washed with water, followed by liquid-solid separation to obtain 550 kg of a polymer.

The resulting polymer had an Mw/Mn of 14.0, a CXS of 1.4%, and an $[\eta]$ of 1.90 dl/g and contained 2180 ppm of the vinylcyclohexane polymer component.

Measurements of Physical Properties

To 100 parts of the resulting polymer were added 0.1 part of Irganox® 1010, 0.2 part of BHT, and 0.1 g of calcium stearate, and the mixture was mixed in a Henschel mixer and then extruded at 230° C. and pelletized by a 40 mmφ pelletizer (manufactured by Tanabe Plastic Kikai K.K.). The specimens for physical property measurements were prepared using the pellets, and the physical properties were measured in the same manner as in Example 1. The results obtained are shown in Table 1 below.

COMPARATIVE EXAMPLE 1

A propylene polymer was obtained in the same manner as in Example 1, except that polymerization of vinylcyclohexane was not conducted. The resulting propylene polymer had an $[\eta]$ of 1.94 dl/g, an Mw/Mn of 12.5, and a CXS of 0.8%.

The physical properties of the resulting polymer were measured in the same manner as in Example 1. The results obtained are shown in Table 1 below.

COMPARATIVE EXAMPLE 2

Physical properties of the polymer as obtained in Comparative Example 1 were evaluated in the same manner as in Example 1, except that the composition for the preparation of specimens further contained 0.3 part of aluminum p-t-butylbenzoate per 100 parts of the propylene polymer. The results obtained are shown in Table 1 below.

EXAMPLE 4

To 100 parts of the propylene polymer obtained in Comparative Example 1 was added 2 parts of a propylene polymer containing 2484 ppm of a vinylcyclohexane polymer which was prepared in the same manner as in Example 1. To 100 parts of the resulting polymer blend were added 0.1 part of Irganox® 1010 and 0.2 part of BHT, and the mixture was melt-kneaded at 230° C. and 50 rpm using a 20 mmφ extruder (manufactured by Tanabe Plastic Kikai K.K.). The resulting polymer had an Mw/Mn of 12.6 and contained 48 ppm of the vinylcyclohexane polymer component.

The polymer was press molded to prepare specimens, and the physical properties of the specimens were evaluated. As a result, they exhibited excellent rigidity and heat resistance as shown in Table 1 below.

COMPARATIVE EXAMPLE 3

1) Synthesis of Solid Catalyst:

In a 200 l-volume reaction vessel whose atmosphere had been displaced with nitrogen were charged 23 l of hexane and 28.6 kg of titanium tetrabutoxide, and the inner temperature was maintained at 40° C. while stirring at 47 rpm.

To the mixture was slowly added dropwise 57 kg of a 40% hexane solution of ethylaluminum sesquichloride over a period of 3 hours, followed by stirring at 40° C. for 30 minutes. The temperature was raised to 60° C., followed by heat treatment for 1 hour. The reaction mixture was filtered, and the solid was washed three times with 90 l portions of hexane to recover a solid product.

To the solid product was added 90 l of hexane to form a slurry, and 1.2 kg of a 15% hexane solution of triethylaluminum was then added thereto. The temperature was raised to 40° C. while stirring at 60 rpm, and 3.3 kg of an ethylene monomer was slowly fed thereto over 2 hours at 40° C. to conduct preliminary polymerization. After completion of the preliminary polymerization, the reaction mixture was filtered, and the solid was washed once with 90 of hexane to recover an ethylene-prepolymerized solid. The ethylene-prepolymerized solid was slurried with 90 l of heptane, and 17 l of diisoamyl ether was added to the slurry while maintaining the system at 30° C., followed by allowing to react at 30° C. for 1 hour. Then, the temperature was elevated to 75° C., and 13.5 l of titanium tetrachloride was added to the mixture, followed by allowing to react at 75° C. for 2 hours. After completion of the reaction, the reaction mixture was filtered, and the solid was washed four times with 90 portions of heptane. The solid was re-slurried with 90 l of hexane, and 1.6 kg of a 40% hexane solution of diethylaluminum chloride was added thereto. After heating to 40° C., 4.5 kg of propylene was fed thereto over 2 hours, followed by filtration. The solid was washed once with 90 of hexane and dried to obtain 20 kg of a solid catalyst component (1). The solid catalyst component (1) contained 18.4% of a trivalent titanium atom, 5.1% of isoamyl ether, 41.2% of chlorine, 1.6% of a butoxy group, and 33.7% of the polymer.

2) Synthesis of Preliminarily Polymerized Catalyst

In a 300 l-volume reaction vessel equipped with a stirrer whose atmosphere had been displaced with nitrogen, 2.15 kg of the solid catalyst component (1) as obtained in 1) above, 100 of butane, and 938 g of diethylaluminum chloride were charged, followed by stirring. The temperature was raised to 40° C., and propylene was fed to the vessel so as to maintain the pressure at 5 kg/cm²G. After a polymerization reaction was conducted for 2.45 hours, the propylene feed was stopped, and the polymerization mixture was filtered through a filter provided at the bottom of the vessel.

To the residue was added 100 of butane, followed by stirring, and the slurry was filtered to obtain a pereliminarily polymerized catalyst. The resulting preliminarily polymerized catalyst was transferred to a jacketed drum having a nozzle for nitrogen feed at the lower part thereof and dried by feeding a small amount of nitrogen while circulating warm water of 50° C. through the jacket, to obtain 26.9 kg of a preliminarily polymerized catalyst.

3) Polymerization of Propylene

After a 1 m³-volume fluidized bed type reaction vessel equipped with a stirrer was thoroughly purged with dehumidified nitrogen, and the gas was made to flow at a rate of 100 m³/hr by driving a gas circulator provided on the circulation line. The amount of the gas circulated was such that polymer particles might be held in a fluidized state throughout the polymerization stage and was kept constant until polymer particles were taken out from the reaction vessel after completion of the polymerization. Then, 60 kg of propylene polymer particles (propylene homopolymer having an $[\eta]$ of 1.7 dl/g and an average particle size of 600 μm) was introduced into the vessel for dispersing the catalyst. After displacing the atmosphere with propylene, the inner pressure was elevated to 5 kg/cm²G by feeding propylene and hydrogen so as to have a hydrogen concentration of 8.8 mol%. Cocatalyst components composed of fifty grams of diethylaluminum chloride and 1.25 g of methyl methacrylate were fed from nozzle under hydrogen pressure, and then 42.6 g of the preliminarily polymerized catalyst obtained in 2) above was fed from another nozzle. The temperature was raised to 60° C., and the pressure was then kept at 5 kg/cm²G for 1 hour. The pressure was then raised to 18.0 kg/cm²G, and polymerization was continued. During the polymerization, hydrogen was fed so as to maintain the hydrogen concentration at 8.8 mol%.

When the amount of the produced polymer reached 32 kg, part of the polymer particles was withdrawn leaving 60 kg within the reaction vessel to complete a first stage of polymerization.

The same catalyst components as used in the first stage were fed to the reactor, except for changing the amounts of diethylaluminum chloride and methyl methacrylate to 28 g and 0.7 g, respectively, to carry out a second stage of polymerization. The polymerization conditions of the second stage were the same as in the first stage, except for using the polymer particles remaining in the vessel for dispersing the catalyst. The polymerization reaction was repeated 7 times in the same manner as described above. The whole amount of the polymer particles was withdrawn and transferred to a 200 l-volume mixing tank, where the polymer particles were treated with 100 g of propylene oxide and 60 g of methyl alcohol at 80° C. for 2 hours and then dried at 80° C. while blowing nitrogen to obtain a white powderous polymer.

The resulting polymer had an Mw/Mn of 8.5, an $[\eta]$ of 1.75, and a CXS of 1.9%.

Measurement of Physical Properties

When the physical properties of the polymer were measured in the same manner as in Example 1, the polymer had a low density (0.908 g/cm³) and a low flexural modulus (17600 kg/cm²). Then, in order to increase crystallinity, specimens were prepared by slowly cooling a pressed sheet between cooling press plates with a 6 mm thick heat insulating plate of asbestos being placed on each press plate. The resulting specimens were evaluated in the same manner as in Example 1, and the results obtained are shown in Table 1.

COMPARATIVE EXAMPLE 4

The polymer obtained in Comparative Example 3 was added to 500 ml of xylene per 20 g of the polymer and dissolved by heating at 130° C. The solution was allowed to stand at 20° C. for 30 minutes, and the precipitated crystalline polymer was filtered to remove a cold xylene-soluble content. The recovered solid polymer was transferred to a Soxhlet's extractor and refluxed in boiling heptane for 6 hours to remove a boiling heptane-soluble content. The residue was dried under reduced pressure to obtain a polymer solely comprising a crystalline polymer. The resulting polymer was evaluated for physical properties in the same manner as in Example 1, and the results obtained are shown in Table 1.

Comparative Example 3 shows an example in which crystalline polypropylene produced using a known catalyst system is molded by slow cooling. In this example, the density markedly increased but, in turn, the long period (L) also increased.

Comparative Example 4 shows an example in which a non-crystalline polymer component is removed from the crystalline polypropylene obtained in Comparative Example 3 by fractionation thereby to obtain an increased crystallinity.

In either of Comparative Examples 3 and 4, the long period (L) does not satisfy the relationship of $L \leq 667d - 5894$, and the effects of physical property improvement are small.

COMPARATIVE EXAMPLE 5

Polymerization of propylene was carried out in the same manner as in Example 3, except for using, as a catalyst system, (1) the solid catalyst containing a vinylcyclohexane polymer as synthesized in Example 1, (2) diethylaluminum chloride, and (3) ε-caprolactone.

The resulting polymer had an [η] of 1.79 dl/g, a CXS of 1.7%, and an Mw/Mn of 8.0 and contained 10000 ppm of the vinylcyclohexane polymer component.

The physical properties of the polymer were measured in the same manner as in Example 1, and the results obtained are shown in Table 1 below.

TABLE 1

| Example No. | Mw/Mn | [η] (dl/g) | CXS (wt %) | PVCH* (wt ppm) | Density (d) (g/cm$^3$) | Long Period (L) (Å) | (Lc)** (Å) | Flexural Modulus (kg/cm$^2$) | VSP (°C.) | Rockwell Hardness R Scale |
|---|---|---|---|---|---|---|---|---|---|---|
| Example 1 | 12.5 | 1.98 | 1.0 | 1890 | 0.913 | 183 | 193 | 22800 | 123 | 109 |
| Example 2 | 11.8 | 1.81 | 1.8 | 13400 | 0.913 | 183 | 193 | 22600 | 120 | 110 |
| Example 3 | 14.0 | 1.90 | 1.4 | 2180 | 0.911 | 174 | 180 | 22700 | 120 | 111 |
| Example 4 | 12.6 | 1.94 | 0.8 | 48 | 0.910 | 168 | 173 | 22000 | 120 | 110 |
| Comparative Example 1 | 12.5 | 1.94 | 0.8 | nil | 0.909 | 161 | 166 | 19500 | 115 | 106 |
| Comparative Example 2 | 12.5 | 1.94 | 0.8 | nil | 0.909 | 171 | 166 | 21100 | 118 | 113 |
| Comparative Example 3 | 8.5 | 1.75 | 1.9 | nil | 0.912 | 194 | 186 | 20000 | 106 | 107 |
| Comparative Example 4 | 4.7 | 1.91 | 0 | nil | 0.909 | 176 | 166 | 19200 | 111 | 109 |
| Comparative Example 5 | 8.0 | 1.79 | 1.7 | 10000 | 0.909 | 175 | 166 | 21300 | 116 | 110 |

Note:
*Polyvinylcyclohexane content
**6667d-5894

EXAMPLE 5

In 5 l-volume glass-made flask were successively charged 3.3 l of dehydration-purified n-heptane, 165 mmol of diethylaluminum chloride, and 500 g of a solid catalyst prepared in the same manner as in Example 1, and propylene was fed at 200 mmHg and at 60° C. to carry out polymerization until the amount of propylene fed reached 400 g. Subsequently, 850 ml of vinylcyclohexane was fed over 1 hour, and the polymerization was continued for an additional 2 hours. The solid catalyst containing the propylene-vinylcyclohexane block copolymer was washed with 2 l of dehydration-purified n-heptane and dried to obtain 1562 g of a solid catalyst containing 400 g of the propylene polymer component and 662 g of the vinylcyclohexane polymer component.

Subsequently, propylene was fed to a 5.7 m$^3$-volume SUS-made reaction vessel equipped with a stirrer at 35° C. to a pressure of 0.5 kg/cm$^2$G, and 2.7 m$^3$ of n-heptane, 20 mol of an organoaluminum compound of formula (OBu)$_{0.3}$Al(C$_2$H$_5$)$_2$Cl$_{0.7}$, and 2 mol of methyl toluylate were successively charged. Then, 1170 g of the above-prepared solid catalyst containing the vinylcyclohexanepropylene block copolymer was added thereto. After the temperature was adjusted to 60° C., propylene was fed at a rate of 500 kg/hr to a pressure of 9 kg/cm$^2$G. Subsequently, propylene was fed so as to maintain the pressure at 9 kg/cm$^2$G and polymerization was continued while feeding hydrogen so as to maintain the gaseous phase concentration at 20% by volume. When the amount of propylene fed reached 970 kg, the propylene feed was stopped, and the polymerization was further continued for 1.0 hour. The pressure at the end of the polymerization was 5 kg/cm$^2$G. The monomers in the reaction vessel were released to decrease the pressure to 0.5 kg/cm$^2$G, and the temperature was adjusted to 50° C. At this time, a polymer sample for analysis was taken, and polymerization of a former stage was completed. Subsequently, ethylene was fed to raise the polymerization pressure to 3 kg/cm$^2$G, and polymerization was continued while feeding a propylene monomer containing 45% of ethylene so as to maintain the pressure at 3 kg/cm$^2$G During the polymerization, hydrogen was fed so as to maintain the gaseous phase concentration at 1.7 vol%. At the point where the amounts of propylene and ethylene fed reached 75 kg and 69 kg, respectively, the polymerization was completed.

The polymerization slurry was immediately transferred to an after treatment tank, and butanol was added to terminate the polymerization, followed by treating at 60° C. for 3 hours. The thus treated slurry was washed with water, followed by liquid-solid separation, to obtain 750 kg of the polymer.

The polymer produced in the former stage had an [η] of 1.60 dl/g, an Mw/Mn of 16.2, a density (d) of 0.912 g/cm$^3$, and a long period (L) of 177 that was less than the Lc value (186 Å). The finally produced block copolymer had an [η] of 2.26 dl/g and an ethylene content of 6.1% and contained 661 ppm of the vinylcyclohexane polymer component.

Measurement of Physical Properties

To 100 parts of the polymer were added 0.1 part of Irganox ® 1010 and 0.2 part of BHT, and the mixture was melt-kneaded in a 20 mmφ extruder (manufactured by Tanabe Plastic Kikai K.K.) at 230° C. and 50 rpm and press molded to obtain specimens for measuring physical properties. As a result, the specimens were excellent in rigidity and heat resistance as shown in Table 2 below.

COMPARATIVE EXAMPLE 6

A propylene polymer was produced in the same manner as in Example 5, except that polymerization of vinylcyclohexane was not conducted. The polymer produced in the former stage had an [η] of 1.57 dl/g, an Mw/Mn of 14.8, a density (d) of 0.908 g/cm$^3$, and a long period (L) of 167 Å, that was greater than the Lc value (160 Å). The finally produced polymer had an [η] of 2.16 dl/g and an ethylene content of 7.3%. The physical properties of the polymer were evaluated in the same manner as in Example 5. As a result, the molded article obtained was inferior to the specimens of Example 5 in rigidity and heat resistance as shown in Table 2 below.

TABLE 2

| Example No. | Propylene Homopolymer Component | | | | | | [η] (dl/g) | Ethylene Content (wt %) | PVCH* (wt ppm) | Flexural Modulus (kg/cm²) | VSP (°C.) | Izod Impact Strength (kg · cm/cm²) |
| --- | --- | --- | --- | --- | --- | --- | --- | --- | --- | --- | --- | --- |
| | Mw/Mn | [η] (dl/g) | CXS (wt %) | Density (d) (g/cm³) | Long Period (L) (Å) | (Lc) (Å) | | | | | | |
| Example 5 | 16.2 | 1.60 | 0.6 | 0.912 | 177 | 186 | 2.26 | 6.1 | 661 | 17200 | 94 | 6.4 |
| Comparative Example 6 | 14.8 | 1.57 | 0.7 | 0.908 | 167 | 160 | 2.16 | 7.3 | nil | 14500 | 87 | 6.6 |

As described above, the crystalline polypropylene according to the present invention, which has an Mw/Mn of 10 or more, an [η] of from 0.8 to 5.0 dl/g, a CXS of not more than 4% by weight, a density of 0.910 g/cm³ or more, and a long period (L) obtained by a small-angle X-ray scattering method at 25° C. satisfying the relationship L≦6667d-5894, is excellent in rigidity, heat resistance, and surface hardness.

Further, the composition comprising the crystalline propylene polymer and a polymer of an α-olefin or vinylcycloalkane whose homopolymer has a melting point of 270° C. or higher has markedly excellent rigidity and heat resistance.

While the invention has been described in detail and with reference to specific embodiments thereof, it will be apparent to one skilled in the art that various changes and modifications can be made therein without departing from the spirit and scope thereof.

What is claimed is:

1. Crystalline polypropylene having a ratio of weight average molecular weight (Mw) to number average molecular weight (Mn) (Mw/Mn) of 10 or more, an intrinsic viscosity [η] of from 0.8 to 5.0 dl/g as measured in tetralin at 135° C., a cold xylene soluble content (CXS) of not more than 4% by weight, a density (d) of 0.910 g/cm³ or more as measured at 23° C., and a long period (L) (Å) as measured at 25° C. by a small-angle X-ray scattering method satisfying the relationship:

$$L \leq Lc = 6667d - 5894$$

wherein d is a density at 23° C.; and Lc is a value (Å) obtained by the equation:

$$Lc = 6667d - 5894.$$

2. A crystalline polypropylene composition comprising (A) crystalline polypropylene having a ratio of weight average molecular weight (Mw) to number average molecular weight (Mn) (Mw/M) of 10 or more, an intrinsic viscosity [η] of from 0.8 to 5.0 dl/g as measured in tetralin at 135° C., and a cold xylene-soluble content (CXS) of not more than 4% by weight and (B) from 1 ppm to 20% by weight, based on the composition, of a polymer of an α-olefin or vinylcycloalkane whose homopolymer has a melting point of not lower than 270° C., said composition having a density (d) of 0.910 g/cm³ or more as measured at 23° C., and a long period (L) (Å) as measured at 25° C. by a small-angle X-ray scattering method satisfying the relationship:

$$L \leq Lc = 6667d - 5894$$

wherein d is a density at 23° C.; and Lc is a value (Å) obtained by the equation:

$$Lc = 6667d - 5894.$$

3. A crystalline polypropylene composition as in claim 2, wherein the polymer (B) is a polymer of a 3-branched α-olefin or vinylcycloalkane having 5 or more carbon atoms.

4. A crystalline polypropylene composition as in claim 2, wherein the polymer (B) is a polymer of vinylcyclopentane or vinylcyclohexane.

5. A crystalline polypropylene composition as in claim 2, wherein the polymer (B) is one or two or more polymers of an α-olefin or vinylcycloalkane whose homopolymer has a melting point of not lower than 270° C.

* * * * *